United States Patent [19]

Weber

[11] 3,724,028

[45] Apr. 3, 1973

[54] METHOD AND APPARATUS FOR PHOTOELECTRIC REPRODUCTION OF CONTINUOUS RELIEF ORIGINALS

[75] Inventor: Guy Weber, Arques La Bataille, France

[73] Assignee: La Cellopane, Paris, France

[22] Filed: May 25, 1971

[21] Appl. No.: 146,626

[52] U.S. Cl.........178/6.6 A, 101/DIG. 13, 346/74 ES

[51] Int. Cl......G03g 13/22, G03g 15/22, H04n 1/30

[58] Field of Search.....................178/6.6 A, 7.1, 7.6; 346/74 ES; 101/DIG. 13

[56] References Cited

UNITED STATES PATENTS

| | | | |
|---|---|---|---|
| 3,523,158 | 8/1970 | Zaphiropoulos | 178/6.6 A |
| 3,329,769 | 7/1967 | Hell | 346/74 ES X |
| 3,465,360 | 9/1969 | Hackley | 346/74 ES X |
| 3,624,661 | 11/1971 | Shebanow | 346/74 ES |
| 3,328,585 | 6/1967 | Briguglio | 178/7.6 X |
| 3,611,419 | 10/1971 | Blumenthal | 346/74 ES |
| 3,130,411 | 4/1964 | Schwertz | 346/74 ES |
| 3,316,348 | 4/1967 | Hufnagel | 178/7.1 X |

*Primary Examiner*—Howard W. Britton
*Attorney*—Sherman and Shalloway

[57] ABSTRACT

A method of photoelectrically reproducing an original or a dielectric support including scanning the original with an incident beam to provide a reflected beam having an intensity varying with relief variations of the original, converting the reflected beam into a plurality of electrical signals having varying amplitudes, and provided a plurality of electric charges on the dielectric support corresponding to the varying amplitudes of the electrical signals such that the dielectric support carries a pattern of electric charges corresponding to the relief of the original, and apparatus for effecting the above described method.

26 Claims, 4 Drawing Figures

INVENTOR,
GUY WEBER
BY
Sherman & Shalloway
ATTORNEYS

INVENTOR,
GUY WEBER
BY Sherman & Shalloway
ATTORNEYS

METHOD AND APPARATUS FOR PHOTOELECTRIC REPRODUCTION OF CONTINUOUS RELIEF ORIGINALS

BACKGROUND OF THE INVENTION

1. Field of the Invention

The present invention pertains to the photoelectric reproduction of continuous relief originals and, more particularly, to such reproduction utilizing discrete punctate electric charges.

2. Discussion of the Prior Art

The problems of reproducing continuous relief, black and white and color originals is one that has not been satisfactorily solved where such originals are to be reproduced by photoelectric methods and apparatus. Such originals are reproduced in the printing field by utilizing a very fine mesh grid supported on a frame and projecting an image of the original onto a photographic film through the grid. The projected image, thus, is composed of dots whose size varies with the density of the color of the original and this dot image is utilized as a matrix for printing since it presents the illusion of continuous color to the human eye.

Until the present, the use of a fine mesh grid has been the only satisfactory method of reproducing continuous relief originals; however, this method is useful only with photo-sensitive reproduction processes and is not adaptable to non-photo-sensitive reproduction methods, such as photoelectric reproduction. The only manner in which photoelectric reproduction may be utilized to reproduce continuous relief originals requires the superpositioning of various plates and images and necessarily increases costs as well as lengthening the duration of time required for reproduction. Neither of these disadvantages is acceptable for use with contemporary photoelectric reproduction methods and apparatus in that low reproduction time and costs are of primary importance for public acceptance and are desirably reduced to a minimum in order to provide a viable system.

SUMMARY OF THE INVENTION

Accordingly, it is an object of the present invention to provide method and apparatus for photoelectric reproduction of continuous relief originals in a simple, inexpensive, precise, and expeditious manner.

The present invention is generally characterized in a method for photoelectric reproduction of an original on a dielectric support including the steps of scanning the original with an incident beam to provide a reflected beam having an intensity varying with relief variations of the original, converting the reflected beam into a plurality of electrical signals having amplitudes varying in accordance with the intensity of the reflected beam, and providing a plurality of electrical charges on the dielectric support having sizes corresponding to the varying amplitudes of the electrical signals such that the dielectric support carries a pattern of electrical charges corresponding to the relief of the original. The present invention is further generally characterized in apparatus for photoelectric reproduction of an original including means for scanning the original with an incident beam to provide a reflected beam having an intensity varying with relief variations of the original, means for converting the reflected beam into a plurality of electrical signals having amplitudes varying in accordance with the intensity of the reflected beam, support means for positioning a dielectric support at an imaging station, electrode means disposed at the imaging station, and control means for supplying the electrical signals to the electrode means to place a plurality of punctate electric charges on the electric support whereby the dielectric support carries a pattern of electric charges corresponding to the original.

Another object of the present invention is to photoelectrically reproduce continuous relief originals by generating electrical signals corresponding to the color density or relief of the original and chopping the electrical signals to provide a plurality of color density corresponding electrical signals.

A further object of the present invention is to utilize a row of styli extending across a dielectric support on which an image is to be reproduced and sequentially supplying varying potentials to each stylus to form a latent image in the form of a pattern of punctate electric charges on the dielectric support.

The present invention has another object in that method and apparatus for photoelectrically reproducing a continuous relief original includes a dielectric support incrementally movable in a direction transverse to the alignment of a plurality of image producing styli.

A further object of the present invention is to permit full color reproduction of colored originals.

Another object of the present invention is to provide a latent image that is insensitive to light, thereby reducing housing costs and limitations on use.

The present invention has another object in the forming of a latent image electric charge pattern that is durable and not subject to deterioration even prior to developing and fixing.

A further object of the present invention is to form a latent image by a photoelectric process which may be selectively destroyed or modified by action of heat or by application of a reverse field such that the latent image can be partially erased and retouched.

Yet another object of the present invention is to utilize a dielectric support in a photoelectric reproduction to provide an electric charge pattern, latent image which may be destroyed entirely by heat or application of a reverse field such that the dielectric support may be reused.

Some of the advantages of the present invention over the prior art are that reproductions may be provided with great definition in an extremely short time, continuous color originals may be precisely reproduced, direct or reverse and/or positive or negative reproductions are facilitated, the latent image formed may be produced as many times as desired onto one or more supports or copy sheets to provide multiple copies, reproductions may be easily enlarged or reduced in size relative to the original, and color reproductions of color originals is facilitated.

Other objects and advantages of the present invention will become apparent from the following description of the preferred embodiments taken in conjunction with the accompanying drawings.

DESCRIPTION OF THE PREFERRED EMBODIMENT

Figure 1:
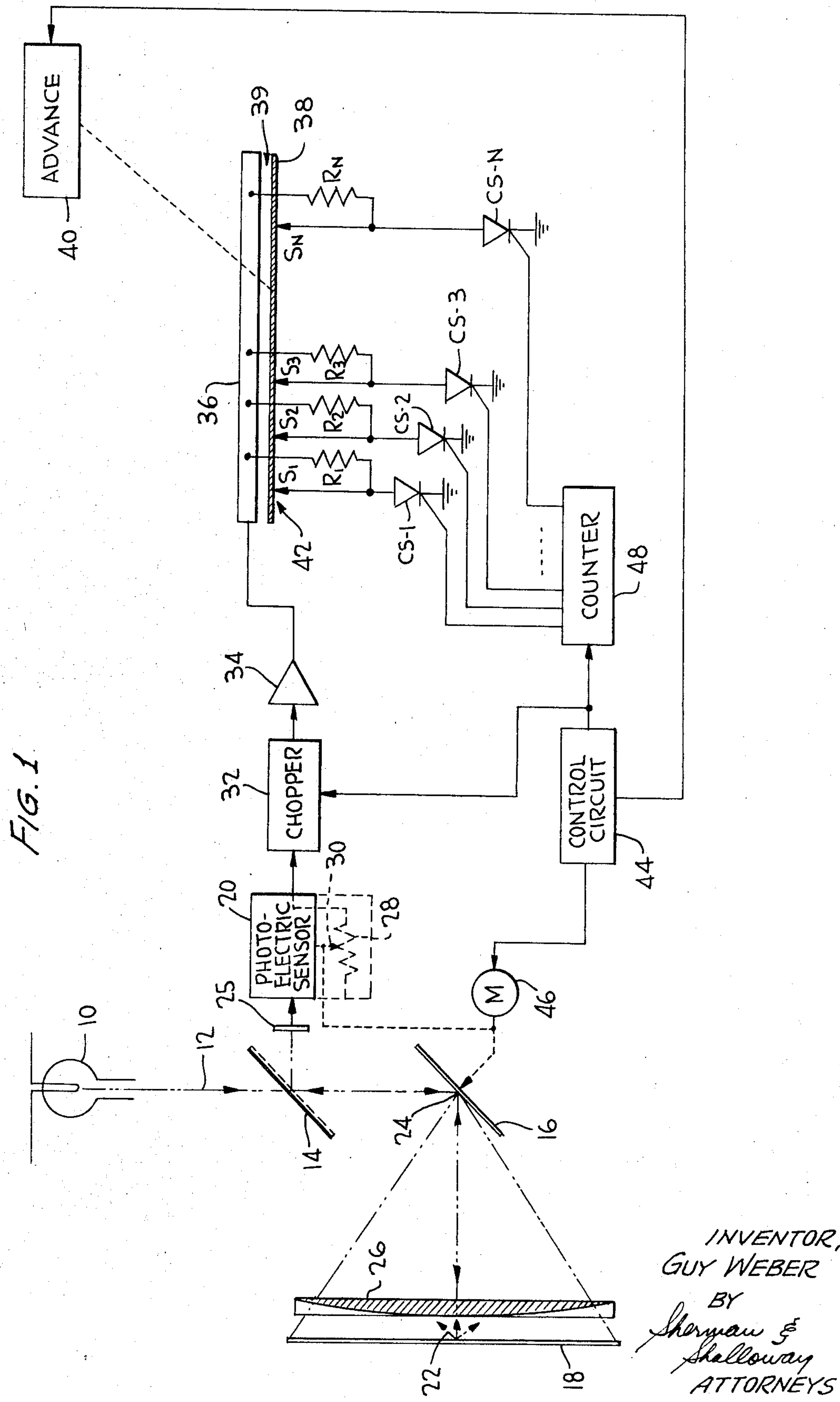
FIG. 1 is a schematic diagram of photoelectric reproduction apparatus according to the present invention.

With reference to FIG. 1, an embodiment of photoelectric apparatus for reproducing continuous relief originals, according to the present invention, includes a light source 10 providing a collimated incident light beam 12 which is directed to a partially reflecting blade 14. The incident beam 12, which is composed of substantially parallel rays, passes through blade 14 to a movable mirror 16 that directs the incident beam 12 toward an original 18 to be copied. Light reflected from original 18 is directed back to mirror 16 and is reflected from mirror 16 to blade 14 where the beam is partially reflected to be received by a photoelectric sensor 20 which operates to generate varying current or voltage signals in accordance with the intensity of the reflected light beam which corresponds to the color density of the original 18.

The incident beam 12, directed from mirror 16 to original 18, can be controlled by varying the optical distance between mirror 16 and original 18, and an aperture may be associated with the mirror to further control the incident beam 12. The incident beam 12 impinges on original 18, such as at a position 22, at a specific time, and the beam is reflected in all directions from position 22 but primarily back towards the point 24 on mirror 16 from which the incident beam emanates. From mirror 16, the reflected beam is directed to blade 14 where the reflected beam is split into a portion directed toward source 10 and a portion reflected to photoelectric sensor 20. Blade 14 is fixed at a stationary position as is source 10, and the path of the reflected beam from blade 14 to sensor 20, thus, remains constant as to direction. Accordingly, an afocal optical device 25 such as a diaphragm may be disposed along the reflected beam path between blade 14 and sensor 20 in order to receive an enlarged image from document 18, the diaphragm being advantageously adjustable as finely as desired.

In order to compensate for local variations of the reflection of light from original 18 as a function of the angle of incidence of the beam 12 on the original, a variable transmission filter 26 is disposed between mirror 16 and original 18. The total effect of the filter 26 is to maintain the reflected beam constant for constant color densitites on the original 18 regardless of the portion of the original being scanned. The filter 26 may be formed, for example, by insulating and making negative a silver photographic plate exposed to the sweep of a beam similar to incident beam 12 before a white surface having a constant reflecting power or albedo. Thus, the resulting surface permits transmission of a constant intensity reflected beam.

Another manner of compensating for local variations of light reflection from original 18 is to utilize a potentiometer 28 having a tap 30 movable along with mirror 16, the potentiometer being connected with sensor 20 to automatically vary the electrical output thereof in accordance with the portion of the original being scanned. Thus, the electrical output signals from sensor 20 are constant during the scanning of a constant albedo surface.

Any photoelectric sensor may be utilized with the present invention with the requirement that such device be capable of precisely converting variations in light intensity of the reflected beam to analog electrical signals. With most such devices, the output is a varying voltage; for instance, a photodiode may be utilized to provide a varying analog voltage dependent upon the intensity of light impinging thereon. Many semiconductor devices have resistance characteristics varying with light and may be utilized with the present invention as well as conventional photocells and photomultiplier tubes.

In a preferred embodiment of the present invention, a photomultiplier tube is utilized as photoelectric sensor 20 to provide a variable current output to a chopper 32 corresponding to variations in intensity of the reflected beam. Chopper 32 is operative to periodically interrupt the analog current output from sensor 20 to provide a plurality of discrete voltage pulses which are amplified by an amplifier 34. The voltage pulses from amplifier 34 are supplied to an elongated electrode 36 which is disposed at 39 adjacent a path of travel for a dielectric support 38.

Dielectric support 38 is conveyed along the path of travel by any conventional means utilized in electrophotographic reproduction such as spaced driven rollers or perforated endless belts exposed to a vacuum to hold the copy sheet by suction. An advancing mechanism 40 is mechanically connected with the dielectric support conveying means in order to move the dielectric support in step by step or row by row manner such that the dielectric support is maintained stationary for a predetermined period of time between movements. On a side 42 of the path of travel opposite side 39 are located a plurality of equally spaced styli $S_1$, $S_2$, $S_3$ . . . $S_n$. The styli are spaced from the dielectric support 38 such that there is no contact therebetween, whereby deterioration of both the dielectric support and the styli is substantially reduced. Normally, the styli will be positioned extremely close to the dielectric support but not in contact therewith; however, it will be appreciated that if voltage values of reduced levels are utilized, it may be preferred to position the styli in contact with the dielectric support in order to increase charge localization. Even in this case, however, the contact may be adjusted such that there is only insignificant pressure.

A control circuit 44 is operative to synchronize the various components of the apparatus of FIG. 1 and includes a pulse generator and suitable logic circuitry to control a motor 46 as well as chopper 32 and a counter 48. Motor 46 is mechanically connected with mirror 16 in order to move the mirror such that the incident beam 12 scans or sweeps across a line or row of the original 18 then retraces and scans a second line just below the first line. Counter 48 receives pulses from control circuit 44 and has a plurality of outputs $O_1, O_2, O_3 \ldots O_n$, each of which is exclusively sequentially energized. The outputs $O_1, O_2, O_3 \ldots O_n$ are connected with the gate electrodes of controlled switches $CS_1, CS_2, CS_3 \ldots CS_n$, respectively, which have their cathodes connected to ground and their anodes connected directly to styli $S_1, S_2, S_3 \ldots S_n$, respectively, and to electrode 36 through resistors $R_1, R_2, R_3 \ldots R_n$, respectively. The controlled switches may be diodes, thyristors, SCR's, gate turn-off devices, or any other switching devices capable of accurately and precisely being energized and deenergized while handling the voltage required to charge the dielectric support.

The styli have very fine points and will normally be equally spaced from each other by no more than 1/10 of a millimeter (0.10mm). Thus, a specific number of styli will be arranged in a single line transverse to the path of travel of the dielectric support 28 and the row of styli are corresponding with each scan or sweeping line of the incident beam 12 on the original 18.

The support 38, which receives punctate electric charges from the styli, is preferably dielectric and composed of a layer of conductive material coated with a layer of electrically insulating material, such supports being well known and forming no part of the present invention. The conductive material may be metal if desired or paper having its conductivity improved by the incorporation therein of additives of electrolytic conductivity. The conductive material so formed is coated either directly or on an intermediate, separate layer with a thin dielectric material generally composed of an insulating varnish with a pliolith base or other suitable resin. While all dielectric supports can be utilized with the present invention, it is preferable that such supports have a dielectric layer with high permittivity in order to decrease the surface area required for deposition of the punctate electric charges. Dielectric supports are presently available wherein the chemical structure of the dielectric material permits the retention of extremely fine charges in close orientation without adversely affecting one another, which charges can be deposited in approximately 1 micro-second. The dielectric support may be a copy sheet which is removed from the apparatus or may be an intermediate sheet that is continuously utilized to carry latent images, which images are transferred after developing to a transfer copy sheet for fixing.

In operation, the pulses from control circuit 34 are operative to control motor 36 so as to cause the motor to move mirror 16 such that original 18 is scanned line by line by incident beam 12. The reflected beam from the original is directed to photoelectric sensor 20 by mirror 16 and blade 14 and, as previously mentioned, photoelectric sensor 20 provides an output corresponding to the intensity of the reflected beam. When sensor 20 is a photomultiplier tube, the output is a varying current which is supplied to chopper 32, and chopper 32 is intermittently operated by pulses from control circuit 34 to supply discrete, extremely short voltage pulses or spikes in a train to amplifier 34 where such pulses are amplified and supplied to electrode 36.

The pulses controlling chopper 32 are also received by counter 48 which is arranged to sequentially trigger the controlled switches. Thus, when the first voltage pulse is present at electrode 36, controlled switch $CS_1$ will be energized at its anode and permit the development of an electric field between stylus $S_1$ and electrode 36. The electric field exists for only an extremely short time as the charge leaks off through resistor $R_1$; however, the dielectric nature of the support 38 will permit retention of the charge at a precise point in alignment with stylus $S_1$. The support 38 will not be subjected to electric fields at any other point along the line of styli during this time since the remainder of the controlled switches are deenergized, thereby providing identical potentials on either side of the dielectric support.

When the next succeeding voltage pulse is supplied to electrode 36 from chopper 32, controlled switch $CS_1$ will be deenergized and controlled switch $CS_2$ will be energized, and an electric charge will be placed on the support in alignment with stylus $S_2$ in the same manner as precisely described with respect to stylus $S_1$.

The operation, as described above, is continued through the entire line of styli in sequential manner until the last point corresponding to stylus $S_n$ has received an electrical charge. Thus, once an entire line of the original 18 has been scanned by the incident beam 12, the variations in relief of the original will be recorded on the dielectric support as a pattern of electric charges having equidistantly spaced centers and configurations varying in dimensions in accordance with the voltage pulses. That is, the variations in intensity of the reflected beam, which correspond to the color density and pattern of the original, will be converted to corresponding voltage signals to provide a corresponding line of varying electric charges on the dielectric support. Accordingly, the continuous relief pattern of the original will be represented in punctate or dot manner on the dielectric support with the size or surface area of the dots proportional to the electric fields produced by the voltage signals.

Once a single line is scanned and recorded as a plurality of punctate electric charges, the motor 46 is returned to the initial scanning position of a second line, counter 48 is reset and paper advance mechanism 40 is energized to move the dielectric support a distance corresponding to the distance between the first and second scanning lines of the original 18. In the same manner as above described, a second line of punctate electric charges will be recorded on the dielectric support, and this process is continued on a line by line basis with the support 38 being moved incrementally until the entire original has been scanned and the dielectric support carries a grid of punctate electric charges having sizes corresponding to the relief characteristics of the original.

Once the dielectric support or a portion thereof has received the electric charges corresponding to a latent image of the original, the pattern of electrical charges may be developed in any known manner, such as by the deposition of oppositely charged toner particles on the support, which toner particles are generally coated with a thermoplastic resin. It will be appreciated that it is a simple matter to provide both positive and negative reproductions of the original in this manner, and combinations of positive and negative reproductions may also be easily obtained. Once the latent image is developed, i.e., made visible, it may be fixed by heat so as to be indelible or the developed or latent image can be transferred to other support sheets of insulative or other nature by contact with the aid of an appropriately charged electrode. Once the image is transferred, it may be developed or, if the image was previously developed, it may be fixed by heat. If a transfer sheet is used, it will be appreciated that the dielectric support 38 may be continuously utilized to provide latent images after being returned to an uncharged state by the application of heat or by reversing the electric field thereacross.

Figure 2:
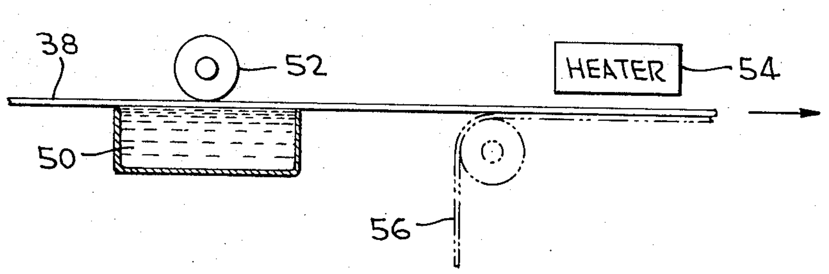
FIG. 2 is a diagrammatic view of a developing station for the apparatus of FIG. 1.

A developing station is diagrammatically illustrated in FIG. 2 and includes a supply of charged toner particles 50 which may take the form of a dry powder or a suspension in a liquid bath. Dielectric support 38 carrying a pattern of electric charges is moved past the supply of charged toner particles 50 with the aid of a roller 42 that may have a potential applied thereto of a polarity opposite to the polarity of the charged toner particles such that the toner particles are attracted to the punctate electric charges on the dielectric support 38 in accordance with the magnitude of the electric charges thereon. Thus, the toner particles will be attracted to the punctate electric charges in amounts according to the charge potential to make visible the latent image on the dielectric support. Once the latent image has been developed, the support 38 is moved past heating means 54 which is operative to fix the developed image on the dielectric support. If it is desired to produce the final copy on a sheet other than the support 38, a transfer sheet 56 may be brought in contact with the developed dielectric support 38 in order to transfer the toner particles from support 38 to sheet 56 and, thereafter, the transferred image is fixed by heat.

Since the dielectric support is selectively provided with punctate electric charges without requiring the direct exposure to light, it will be appreciated that the method and apparatus of the present invention has the advantage of providing latent images having excellent stability and being essentially insensitive to light, thereby simplifying the equipment required to produce and maintain the latent images. Where it is desired to reuse the dielectric support, the electric charges thereacross may be stripped from the support by the application of heat or a reverse polarity field and, after cooling if heat is utilized, the support may be returned to the imaging station for recharging to provide another latent image. Of course, portions of a charged support may be erased and retouched without adversely affecting the other portion to permit modifications of a latent image.

The method and apparatus of the present invention is extremely flexible and adaptable for many uses. For instance, by changing the direction of scanning of the original, reversing the sequential operation of the styli, or changing the direction of movement of the dielectric support, true or reverse images of the original can be produced. Photoelectric reproduction according to the present invention is also adaptable for use with electronic developing assemblies known in the art to permit the deposition of positive or negative charged toner as desired such that both positive and negative reproductions of an original may be obtained with a single toner. The size or dimensions of the copy or latent image may be simply controlled by controlling the speed and amplitude of scanning of the original or of the deposition of electric charges on the dielectric support in order to provide reduced and enlarged images.

Figure 3:
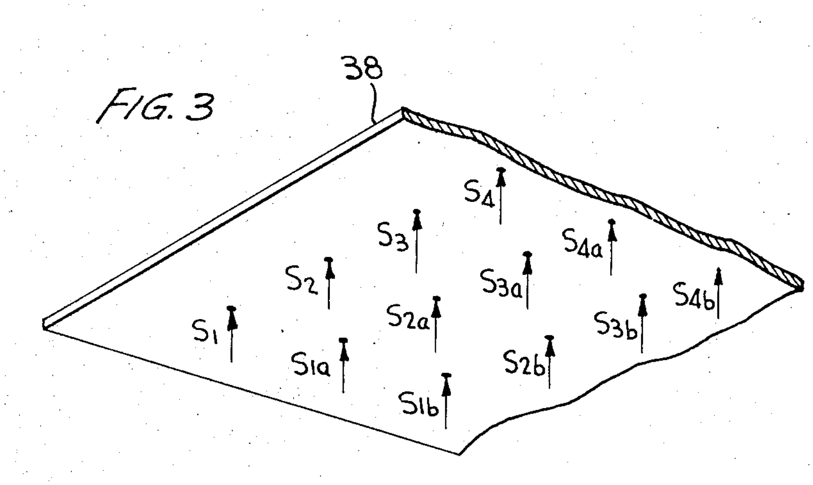
FIG. 3 is a broken perspective of a modification of the apparatus of FIG. 1.

As illustrated in FIG. 3, the styli may be arranged in a plurality of rows to form a matrix corresponding to all points on the dielectric support where it is desired to provide punctate electric charges. With this modification of the apparatus of FIG. 1, the dielectric support need not be moved on a line by line basis in that each row of styli may be selectively controlled so that when a second line of the original is being scanned the second row of styli is being sequentially energized.

In order to operate the embodiment of FIG. 3, two sets of controlled switches are used to energize the styli in matrix fashion such that the number of controlled switches is not materially increased.

The illumination or scanning of the original may be accomplished either by sweeping or scanning in lines or in columns, as described above, or by movement of the original on a line by line or other predetermined basis. Another manner for illuminating the original in accordance with the present invention includes the formation of a total image of the original on camera tubes such as vidicons or orthicons, as utilized in television systems, and these images are electronically scanned line by line to develop a current proportional to the relief of the original. Similarly, the original can be scanned by laser beams which offer the advantages of the use of practically parallel beams to increase the scanning rate up to 1 million points per second. Of course, the mirror 16 may be provided with any convenient shape to facilitate scanning of the original.

Figure 4:
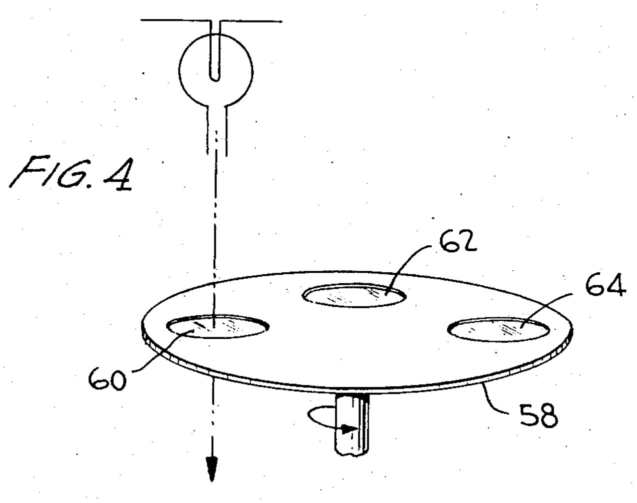
FIG. 4 is a schematic diagram of the apparatus of FIG. 1 for use in reproducing color originals.

The method and apparatus of the present invention are easily adapted for use in producing color reproductions of colored continuous relief originals by sequentially scanning the original with the three fundamental colors, blue, magenta, and yellow, and fixing the developed image after each scan and prior to the succeeding scan of a different color. For instance, as illustrated in FIG. 4, a disk 58 may be utilized having primary blue, magenta, and yellow filters 60, 62, and 64, respectively, set therein such that a scan in the manner as described above may be completed with each fundamental color. Furthermore, the method and apparatus may be adapted such that the original is simultaneously scanned at three different places such that each portion of the original is successively scanned by three identical apparatus, as illustrated in FIG. 1, and the three sets of electrical signals are supplied to three different sets of styli which successively sweep each point of the dielectric support and are speed controlled such that each point on the dielectric support corresponding to a point on the original is charged three times in succession. Between charging, each of the electric charges is made visible with toner of the appropriate fundamental color, fixed, and returned to the imaging station to be charged by a scan representative of the next fundamental color. Due to the speed required for fixing in such a process, it is preferable to utilize high frequency induction to fix the developed toner, thereby eliminating thermal remenance and permitting the dielectric support to instantaneously recover the dielectric properties in sufficient time to receive the next electric charge image disposed in accordance with the next fundamental color. The superposition of the fundamental colors at each point provides a color image providing the impression of the continuous relief of the original to the human eye without requiring a photographic plate.

The distance separating the means for converting the reflected beam into a plurality of electrical signals having discrete amplitudes may be located close to or remote from the imaging station such that the electrical signals may be either directly supplied to the imaging station or transmitted by conventional telecommunication means with amplitude or frequency modulation or coding to be received at a remote imaging station.

Inasmuch as the present invention is subject to many variations, modifications, and changes in detail, it is intended that all matter above described or shown in the accompanying drawings be interpreted as illustrative and not in a limiting sense.

What is claimed is:

1. A method of photoelectrically reproducing an original on a dielectric support comprising the steps of scanning the original with an incident beam to provide a reflected beam having an intensity varying with relief variations of the original, converting the reflected beam into a plurality of electric signals having varying amplitudes, and providing a plurality of punctate electric charges on the dielectric support having centers spaced equidistantly, each of said electric charges having a configuration varying in dimensions in accordance with the amplitude of one of the electrical signals such that the dielectric support carries a pattern of electric charges corresponding to the relief of the original.

2. The method as recited in claim 1 and further comprising the steps of developing the electric charge pattern with oppositely charged toner particles, transferring the toner pattern to a transfer sheet and heating the transferred toner to fix the pattern.

3. The method as recited in claim 1 wherein said scanning step includes passing the incident beam successively through three primary filters, each of which permits the passage of light of only one of the fundamental colors therethrough and further comprising the steps of developing the electric charge pattern on the dielectric support and fixing the developed pattern after each successive scanning step with each of the fundamental colors.

4. The method as recited in claim 1 wherein said converting step includes providing a continuously varying amplitude electrical signal corresponding to varying intensity of the reflected beam and chopping the continuously varying amplitude electrical signal to supply the plurality of electrical signals sequentially with each signal having a discrete amplitude.

5. The method as recited in claim 4 wherein said chopping step includes providing the sequential electrical signals with discrete voltage amplitudes.

6. The method as recited in claim 5 wherein said step of providing a continuously varying amplitude electrical signal includes providing the electrical signal with a continuously varying current amplitude.

7. The method as recited in claim 5 wherein said step of providing a plurality of electric charges on the dielectric support includes sequentially energizing a plurality of styli disposed in a predetermined arrangement adjacent the dielectric support to selectively charge punctate areas of the dielectric support in accordance with the sequential, discrete voltage amplitude electrical signals.

8. The method as recited in claim 7 wherein said chopping step and said sequential energizing step are synchronized.

9. The method as recited in claim 8 wherein said scanning step includes scanning said original in a predetermined order corresponding to said predetermined arrangement of styli.

10. The method as recited in claim 8 wherein said scanning step includes scanning said original line by line, said step of providing a plurality of electric charges includes moving the dielectric support line by line in synchronism with the line by line scanning of the original, and the styli are arranged in a row transverse to the direction of movement of the dielectric support.

11. The method as recited in claim 8 wherein said scanning step includes scanning the original line by line, the styli are arranged in a plurality of rows and said sequential energizing step includes sequentially energizing the styli row by row in synchronism with the line by line scanning of the original.

12. Apparatus for photoelectric reproduction of an original comprising means for scanning the original with an incident beam to provide a reflected beam having an intensity varying with relief variations of the original;

means for converting said reflected beam into a plurality of electrical signals having amplitudes varying in accordance with the intensity of said reflected beam;

support means for positioning a dielectric support at an imaging station and maintaining the dielectric support stationary for a predetermined period of time;

electrode means disposed at said imaging station; and control means for supplying said electrical signals to said electrode means during said predetermined period of time to place a plurality of punctate electric charges on the dielectric support, each of said electric charges having a configuration varying in dimensions in accordance with the amplitude of one of said plurality of electrical signals, whereby the dielectric support carries a pattern of electric charges having sizes corresponding to the relief of the original.

13. The apparatus as recited in claim 12 wherein said scanning means includes means for sequentially scanning the original with incident light beams of fundamental colors whereby colored originals may be reproduced in color.

14. The apparatus as recited in claim 13 wherein said sequential scanning means includes a plurality of filters movable in the path of said incident beam.

15. The apparatus as recited in claim 12 and further comprising developing means for disposing charged toner particles on the dielectric support whereby said pattern is made visible.

16. The apparatus as recited in claim 15 wherein said developing means includes heating means for fixing said toner pattern.

17. The apparatus as recited in claim 15 wherein said developing means includes means for transferring said toner pattern to a transfer sheet and heating means for fixing said transferred toner pattern.

18. The apparatus as recited in claim 12 wherein said scanning means includes means for compensating for local variations of reflecting power of the original as a function of the angle of incidence of said incident beam of the original.

19. The apparatus as recited in claim 18 wherein said compensating means includes a variable transmission filter.

20. The apparatus as recited in claim 18 wherein said compensating means includes means for modifying the amplitude of said electrical signals in accordance with the portion of the original being scanned.

21. The apparatus recited in claim 12 wherein said converting means includes photoelectric sensing means providing a continuous electrical signal having an amplitude varying with the intensity of said reflected beam and chopper means receiving said continuous electrical signal and providing said plurality of electrical signals each having a discrete amplitude.

22. The apparatus as recited in claim 21 wherein said electrode means includes an elongated electrode disposed on one side of the dielectric support and a plurality of equally spaced styli disposed on the opposite side of the dielectric support.

23. The apparatus as recited in claim 22 wherein said control means includes means supplying said plurality of electrical signals to said elongated electrode and controlled switch means connected with each of said styli to sequentially energize said styli.

24. The apparatus as recited in claim 23 wherein said styli are arranged in a plurality of rows, said scanning means includes means for scanning the original line by line, and said control means includes means for energizing said styli sequentially row by row in synchronism with said line by line scanning means.

25. The apparatus as recited in claim 23 wherein said styli are arranged in a row, said scanning means includes means for scanning the original line by line, and said support means includes means for moving the dielectric support line by line past said row of styli.

26. The apparatus as recited in claim 25 wherein said control means is connected with said scanning means, said chopper means and said controlled switch means to synchronize the operation thereof.

* * * * *

UNITED STATES PATENT OFFICE
CERTIFICATE OF CORRECTION

Patent No. 3,724,028 Dated April 3, 1973

Inventor(s) Guy WEBER

It is certified that error appears in the above-identified patent and that said Letters Patent are hereby corrected as shown below:

In the Heading, insert the following:

--Claims priority, application France, May 25, 1970, 70/18901--

Signed and sealed this 24th day of September 1974.

(SEAL)
Attest:

McCOY M. GIBSON JR.
Attesting Officer

C. MARSHALL DANN
Commissioner of Patents